(12) United States Patent
Lopes et al.

(10) Patent No.: US 11,099,989 B2
(45) Date of Patent: Aug. 24, 2021

(54) COHERENCY MAINTENANCE VIA PHYSICAL CACHE COORDINATE COMPARISON

(71) Applicant: International Business Machines Corporation, Armonk, NY (US)

(72) Inventors: Kevin Lopes, Wallkill, NY (US); Deanna P. D. Berger, Hyde Park, NY (US); Chad G. Wilson, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 133 days.

(21) Appl. No.: 16/299,287

(22) Filed: Mar. 12, 2019

(65) Prior Publication Data

US 2020/0293448 A1    Sep. 17, 2020

(51) Int. Cl.
*G06F 12/0811* (2016.01)
*G06F 12/0875* (2016.01)
*G06F 12/0817* (2016.01)

(52) U.S. Cl.
CPC ...... *G06F 12/0811* (2013.01); *G06F 12/0828* (2013.01); *G06F 12/0875* (2013.01)

(58) Field of Classification Search
None
See application file for complete search history.

(56) References Cited

U.S. PATENT DOCUMENTS

| | | | |
|---|---|---|---|
| 5,826,052 A | 10/1998 | Stiles et al. | |
| 7,284,094 B2 | 10/2007 | Hrusecky et al. | |
| 8,868,838 B1 | 10/2014 | Glasco et al. | |
| 9,244,851 B2 | 1/2016 | Ambroladze et al. | |
| 9,703,661 B2 | 7/2017 | Ambroladze et al. | |
| 2008/0177953 A1 | 7/2008 | Bell et al. | |
| 2010/0325367 A1* | 12/2010 | Kornegay | G06F 12/0804 711/143 |
| 2011/0153986 A1 | 6/2011 | Alexander et al. | |
| 2014/0181402 A1 | 6/2014 | White | |
| 2015/0347297 A1 | 12/2015 | Hagersten et al. | |

\* cited by examiner

*Primary Examiner* — Michael Alsip
(74) *Attorney, Agent, or Firm* — Cantor Colburn LLP; Margaret McNamara

(57) ABSTRACT

Utilizing physical cache address comparison for maintaining coherency. Operations are performed on data in lines of a cache of the computing system and virtual addresses are loaded into a cache controller. The virtual addresses correspond with lines associated with performing the operations. A physical address of a line is determined in response to having performed a first cache directory lookup of the line. The physical address from the first operation is compared with other physical addresses associated with other operations to determine whether the other operations utilize the same physical address as the first operation. In response to matching physical locations, determinations are made as to whether a conflict exists in the data at the physical addresses that match. Thus, the coherency maintenance is free from looking up virtual addresses to determine whether the line of the cache includes incoherent data.

20 Claims, 3 Drawing Sheets

COHERENCY MAINTENANCE VIA PHYSICAL CACHE COORDINATE COMPARISON

BACKGROUND

The invention relates generally to cache coherency maintenance and, more particularly, to performing coherency maintenance without looking up virtual addresses to determine whether particular lines of the cache include incoherent data.

Coherency maintenance ensures there are no conflicts between different operations of a computing system. Preferably only one operation works on a line of a cache at a time. Traditionally, coherency maintenance utilizes virtual addresses obtained from the processor core. The virtual addresses are then looked up in a controller of the cache in order to determine corresponding physical addresses for conducting coherency maintenance. This requires instruction pipelining within the processor which effects the processor's performance. Thus, what is needed is a means to reduce the use of the cache controller by eliminating the use of virtual addresses during coherency maintenance and, therefore, increases processor performance.

SUMMARY

According to a non-limiting embodiment, a computer implemented method for maintaining coherency utilizing physical address comparison within a computing system is provided. The method includes performing operations on data in lines of a cache of the computing system and loading a controller of the cache with virtual addresses into an address bank of the controller of the cache, wherein the virtual addresses correspond to the lines associated with performing the operations that utilize the cache. The method also includes determining a physical address of a line in response to having performed a first cache directory lookup of the line and loading a physical address in the controller, comparing the physical address loaded to the controller from the first operation with physical addresses associated with other operations, and determining whether the other operations utilize the same physical address as the first operation. The method then includes, in response to two or more of the physical locations matching, determining whether a conflict exists in the data at the physical addresses that match. Thus, the coherency maintenance is free from looking up a virtual address in the address bank of the controller to determine whether the line of the cache includes incoherent data.

According to another non-limiting embodiment, a cache of a computing system storing cache data is provided. The cache includes one or more processing circuits and a purge controller. The one or more processing circuits perform operations on data in lines of the cache of the computing system and load virtual addresses into an address bank of the controller. The virtual addresses correspond to the lines associated with performing the operations which utilize the cache. The one or more processing circuits determine a physical address of a line in response to having performed a first cache directory lookup of the line and load the physical address into the controller. The one or more processing circuits also compare the physical address loaded to the controller from the first operation with other physical addresses associated with other operations, determine whether the other operations utilize the same physical address as the first operation, and in response to two or more of the physical locations matching, determine whether a conflict exists in the data at the physical addresses that match. The one or more processing circuits are free from looking up a virtual address in the address bank of the controller to determine whether the line of the cache includes incoherent data.

According to yet another non-limiting embodiment, a computer program product is provided. The computer program product includes a computer readable storage medium having program instructions embodied therewith, the program instructions executable by a computer processor to cause the computer processor to perform a method for maintaining coherency utilizing physical address comparison. A non-limiting example of the method includes performing operations on data in lines of a cache of the computing system and loading a controller of the cache with virtual addresses into an address bank of the controller of the cache, wherein the virtual addresses correspond to the lines associated with performing the operations which utilize the cache. The method also includes determining a physical address of a line in response to having performed a first cache directory lookup of the line and loading a physical address in the controller, comparing the physical address loaded to the controller from the first operation with physical addresses associated with other operations, and determining whether the other operations utilize the same physical address as the first operation. The method then includes, in response to two or more of the physical locations matching, determining whether a conflict exists in the data at the physical addresses that match. The method is free from looking up a virtual address in the address bank of the controller to determine whether the line of the cache includes incoherent data.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings, in which:

DETAILED DESCRIPTION

Figure 1:
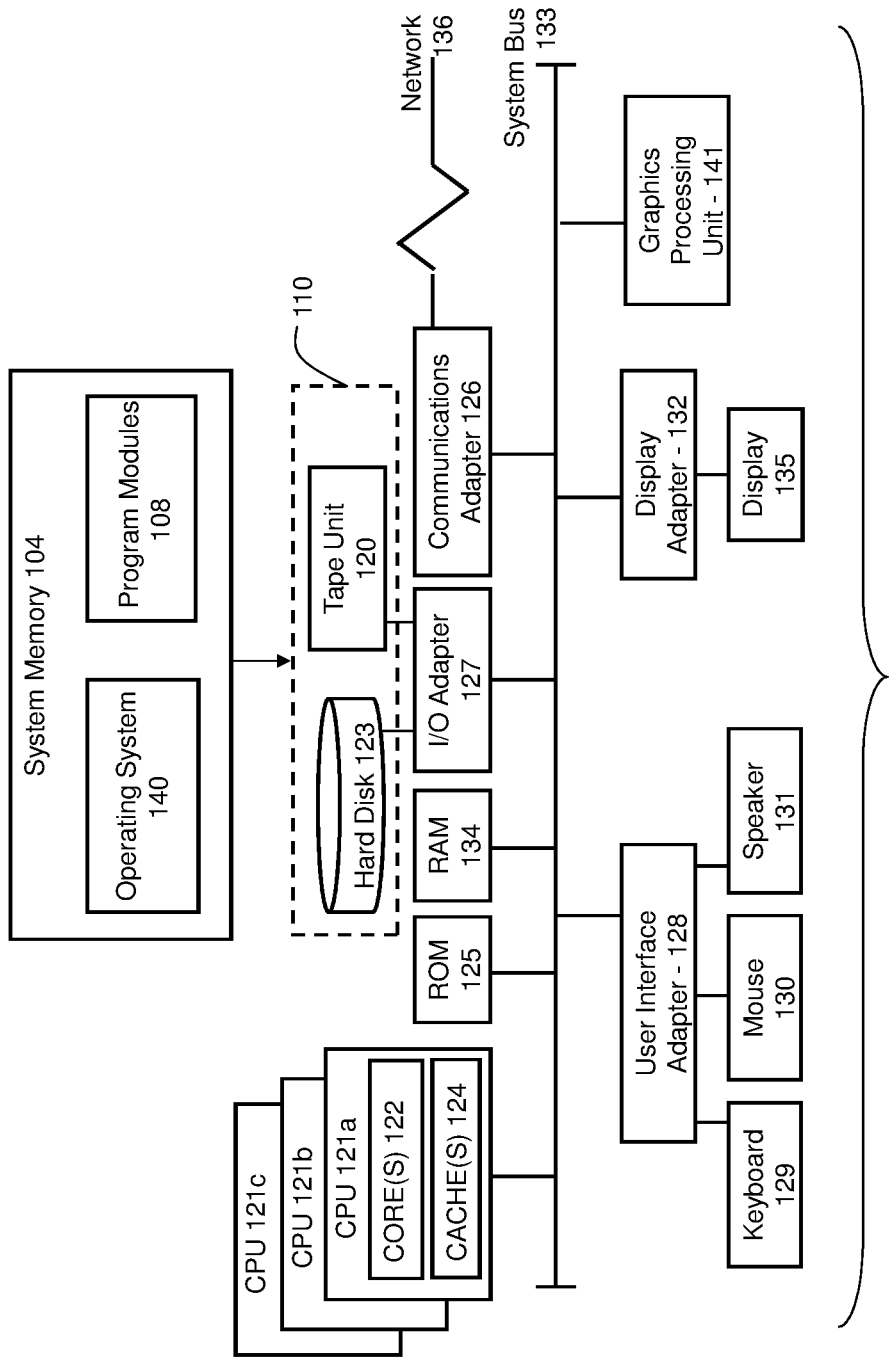
FIG. 1 is a block diagram illustrating a computer system implementing cache coherency maintenance utilizing physical address comparison in accordance with various embodiments of the invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computer systems and specific computer programs to implement the various technical features described herein are well known. Accordingly, in the interest of brevity, many conventional implementation details are only mentioned briefly herein or are omitted entirely without providing the well-known system and/or process details.

Referring now to FIG. 1, a computer system 100 is illustrated according to a non-limiting embodiment. In FIG. 1 the computer system 100 is shown in the form of a general-purpose computer device which also may be referred to as a processing device. In some embodiments, the computer system 100 may be a management server, a web server, laptop computer, tablet computer, netbook computer, a personal computer (PC), a desktop computer, or any programmable electronic device capable of receiving and sending data and processing program instructions.

The components of computer system 100 may include, but are not limited to, one or more central processing units (CPUs) 121a, 121b, 121c, etc. (collectively or generically referred to as processor(s) 121). In one or more embodiments, each processor 121 includes one or more cores 122 and one or more caches 124. There may be any number of cores with each processor 121. Also, each processor 121 may include any number of cache levels operatively connected to one another. Processors 121 are coupled to system memory (RAM) 134 and various other components via a system bus 133. Read only memory (ROM) 125 is coupled to the system bus 133 and may include a basic input/output system (BIOS), which controls certain basic functions of computer system 100.

Cache 124, for example, may have 1 to N congruence classes (rows) and 1 to N sets (columns) as understood by those skilled in the art. Each congruence class can also be referred to as an addressable index and each set can be referred to as a compartment. Cache 124 has numerous memory elements or cells where each memory element stores data. Cache 124 preferably is a fast memory that enhances the performance of the processor 121 by holding recently accessed data, and data near accessed data, from RAM 134. Although cache 124 is depicted as on-processor cache, one or more caches may be off-processor cache. Data retrieved from RAM 134 may be cached in any of the caches. Typically, the cache size increases as the cache level increases while the speed at which data can be accessed decreases as the cache level increases, primarily because lower level caches are located close to core 122 and/or processor 121. Thus, it should be understood that different cache arrangements, in both a number of cache levels and location within the system, are recognized by embodiments of the present invention. Further, some cache levels may be dedicated to a core 122, while other cache levels may be shared between multiple cores 122 of a processor 121.

FIG. 1 further depicts an input/output (I/O) adapter 127 and a network adapter 126 coupled to the system bus 133. I/O adapter 127 may be a small computer system interface (SCSI) adapter that communicates with a hard disk 123 and/or tape storage drive 120 or any other similar component. I/O adapter 127, hard disk 123, and tape storage device 120 are collectively referred to herein as mass storage 110.

Depending on the configuration and type of computer system 100, system memory 104 includes, but is not limited to, volatile storage (e.g., random access memory), non-volatile storage (e.g., read-only memory), flash memory, or any combination of such memories. According to an aspect, the system memory 104 includes an operating system 140 and one or more program modules 108 for execution by one or more processors 121 via the caches 124. Operating system 140 for execution on the processing system 100 may be stored in mass storage 110. However, the operating system 140 may also be stored in RAM 134 of the computer system 100. Operating systems according to embodiments of the present invention include, for example, UNIX™, Linux™, Microsoft XP™, AIX™, and IBM's i5/OS™.

A network adapter 126 interconnects bus 133 with an outside network 136 enabling the computer system 100 to communicate with other such systems. A screen (e.g., a display monitor) 135 is connected to system bus 133 by display adaptor 132, which may include a graphics adapter to improve the performance of graphics intensive applications and a video controller. In one embodiment, adapters 127, 126, and 132 may be connected to one or more I/O busses that are connected to system bus 133 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 133 via user interface adapter 128 and display adapter 132. A keyboard 129, mouse 130, and speaker 131 all interconnected to bus 133 via user interface adapter 128, which may include, for example, a Super I/O chip integrating multiple device adapters into a single integrated circuit.

In exemplary embodiments, the computer system 100 includes a graphics processing unit 141. Graphics processing unit 141 is a specialized electronic circuit designed to manipulate and alter memory to accelerate the creation of images in a frame buffer intended for output to a display. In general, graphics processing unit 141 is very efficient at manipulating computer graphics and image processing and has a highly parallel structure that makes it more effective than general-purpose CPUs for algorithms where processing of large blocks of data is done in parallel.

Thus, as configured in FIG. 1, the computer system 100 includes processing capability in the form of processors 121, storage capability including RAM 134 and mass storage 110, input means such as keyboard 129 and mouse 130, and output capability including speaker 131 and display 135. In one embodiment, a portion of RAM 134 and mass storage 110 collectively store the operating system 140 to coordinate the functions of the various components shown in FIG. 1.

Figure 2:
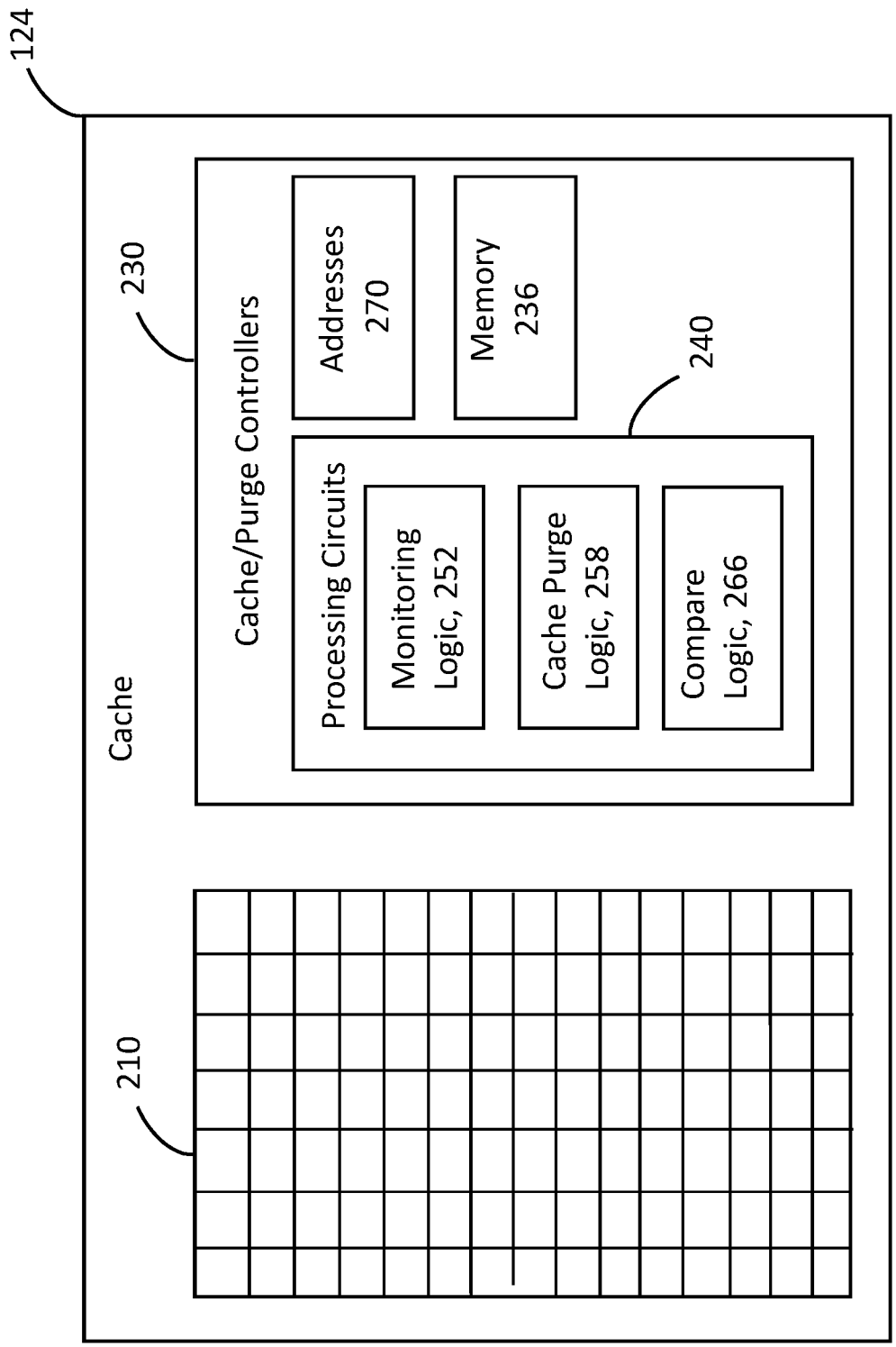
FIG. 2 is a block diagram illustrating a cache including a cache controller of the computing system for maintaining coherency utilizing physical address comparison according to one or more embodiments of the present invention.

FIG. 2 depicts one or more cache controllers 230 of the cache 124 of the computing system 100 for maintaining coherency utilizing physical address comparison in accordance with one or more embodiments. In one or more embodiments, cache 124 includes multiple controllers. As depicted in FIG. 2, for example, a cache controller 230 may be referred to as a purge controller 230. The cache controller 230 controls loading (writing), evicting, and reading (requesting) data in the memory elements 210 of the cache 124. Cache 124 also includes a cache directory which maintains the state of each set (compartment). The cache controller 230 also controls and makes updates to the cache directory as well as memory elements 210.

Each cache controller 230 includes a memory 236. Memory 236 is a storage location accessible to a cache controller 230. In some embodiments memory 236 may be located on cache controller 230. Memory 236 stores a minimum number threshold, an error threshold, and the available number of sets available for data storage.

Each cache controller 230 also includes processing circuits 240 which may be application specific integrated circuits (ASIC) as well as various state machines that switches states upon reading a series of inputs. Each state specifies which state to switch for a given input. For example, the processing circuits 240 of the cache controller 230 may include monitoring logic 252 for identifying errors in cache 124. Monitoring logic 252 also operates to initiate cache purge logic 258. Monitoring logic 252 may be hardware or software logic. In some embodiments, monitoring logic 252 is executed by cache controller 230 which can include various state machines and/or millicode that may be configured to perform the actions.

The cache purge logic 258 operates to mark sets (compartments) within cache 124 indicated by monitoring logic 230 as killed and, thus, indicating that the marked sets should not be used for future operations. Cache purge logic 258 also operates to load castout logic for each set marked as killed. Cache purge logic 258 may be hardware or software logic. In some embodiments, cache purge logic 258 is executed by cache controller 230 which can include various state machines and/or millicode that may be configured to perform the actions.

In one or more embodiments, the cache controller 230 also includes castout logic which operates to evict, castout, or purge out data from sets marked as killed within each index of the section of cache 124. Castout logic may be hardware or software logic. In some embodiments, castout logic is executed by cache controller 230 which can include various state machines and/or millicode that may be configured to perform the actions.

When a directory or cache line error is detected, the congruence class and the compartment is relayed to the purge controller 230 and saved there. This provides the cache coordinate (physical address) without having to look up the compartment (set) in the directory of the controller 230. However, permission to access the full physical address (row and compartment) has not yet been obtained. Thus, when either a non-purge controller (after the cache coordinate is received) or a purge controller makes subsequent pipe passes, compare logic 266 checks whether either of the controllers 230 has a full compare against the other. Traditionally, the virtual address is used to check for a full compare, otherwise the compare logic 266 performs congruence class compare which is an over compare.

It is desirable to purge known errors as soon as possible because delays could cause more catastrophic recovery actions. Thus, cache coherency must be maintained while purging lines of the cache 124. However, it should be noted that the cause of the purge may have been a failure in the integrity of the portion of the virtual address stored in the cache directory entry. This renders it impossible to utilize a full virtual address compare to maintain coherency. Prior art maintained cache coherency for the purge controller by preventing the purge from starting if any other cache controllers were operating on the same addressable index. This over compare resulted in the possibility of the purge request looping in the cache management pipeline waiting for operations that may or may not have been to the same compartment as the compartment targeted by the purge controller. In our embodiment, pipe looping is minimized by replacing the addressable index coherency over compare with a compare of the entire cache coordinate (addressable index and compartment). This prevents the purge operation from needlessly waiting for operations that are in the same row but are not the same column, thereby speeding up the completion of the purge operation. Thus, this allows the purge to be completed in the same amount of time that it would take if the controller 230 had the ability to perform a full virtual address compare even though it does not.

While performing non-purge operations on data in lines of the cache 124 of the computing system 100, a directory sometimes referred to as an address bank or address stack 270 of the cache controller 230 is loaded with virtual addresses (absolute addresses). The virtual addresses include the full address (tag and congruence class (row)). The controller 230 makes an initial pipe pass to look up in the directory the compartment (set) of the matching line. Together, the congruence class (row) and compartment (set) make up the full cache coordinate (physical address). This compartment will be saved in the address stack of the controller 230 once received. In other words, determining the physical address of the line upon with a particular operation was performed includes performing an initial pass of instruction pipelining to lookup the virtual address where the virtual address corresponds with a location in the cache. The physical address is then determined from that location in the cache 124 and the physical address is then used for subsequently performing other operations. That location corresponds with a row and a compartment of the cache 124 for determining the physical address.

In accordance with one or more embodiments of the present invention, the physical address of a line of the cache 124 is determined in response to having performed a cache directory lookup of that line. Thus, the physical address is loaded to the controller 230 and, when comparing against the purge controller 230, the compare logic 266 instead uses the physical address (the cache coordinates (congruence class and compartment)) to do the equivalent of a full compare. In other words, the physical address loaded to the controller from a first operation is compared with physical addresses associated with other operations for determining whether the other operations utilize the same physical address as the first operation. This indicates to the purge controller 230 going through the pipe whether it gets rejected due to a full compare against another controller based on the coordinate instead of using the congruence class compare. Thus, in response to two or more of the physical locations matching, the existence of a conflict is determined in the data at the physical addresses that match. For example, an error detected via the purge controller 230 in data associated with the line of the cache 124 corresponding with a particular operation uses the physical address loaded to the controller 230 to purge data from the line of the cache 124. Also, for example, an error detected in a directory of the purge controller 230 results in loading the purge controller 230 with a line in the directory and the physical address loaded to the purge controller 230 is used to purge data from the line of the directory.

In this way, the system is free from looking up a virtual address in the address bank of the controller to determine whether the line of the cache 124 includes incoherent data. Also, the purge controller 230 encounters less rejects and is allowed to continue purging lines from the cache 124. Other controllers are also then blocked from accessing the same location as the purge controller 230 in order to maintain coherency and faster cleanup of erroneous cache lines.

Figure 3:
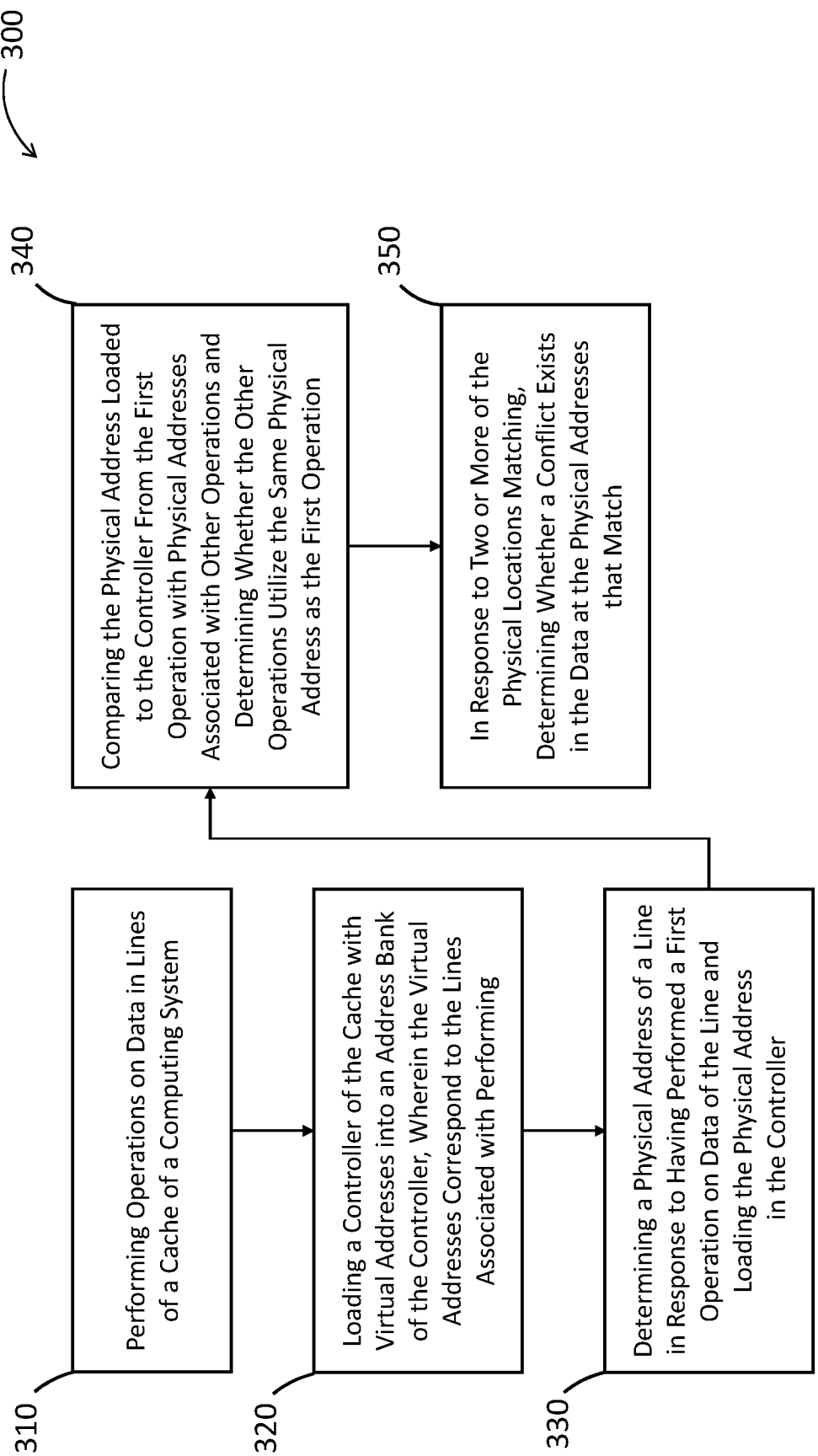
FIG. 3 is a flow diagram illustrating a method for maintaining coherency utilizing physical address comparison according to one or more embodiments of the present invention.

Turning now to FIG. 3, a computer implemented method 300 for maintaining coherency utilizing physical address comparison is illustrated according to a non-limiting embodiment. The flow diagram of FIG. 3 illustrates the method 300 that includes process block 310 for performing operations on data in lines of a cache of the computing system 100 and process block 320 for loading a controller of the cache with virtual addresses into an address bank of the controller of the cache, wherein the virtual addresses correspond to the lines associated with performing the operations which utilize the cache. In one or more embodiments one or more of the controllers is a purge controller. The method 300 also includes process block 330 for determining a physical address of a line in response to having performed a first cache directory lookup of the line and loading a physical address in the controller. In one or more embodiments, the first operation may be a non-purge operation. The method 300 then includes process block 340 for comparing the physical address loaded to the controller from the first operation with physical addresses associated with other operations and for determining whether the other operations utilize the same physical address as the first operation. Method 300 also includes process block 350 for determining whether a conflict exists in the data at the physical addresses that match in response to two or more of the physical locations matching. The method 300 is free from looking up a virtual address in the address bank of the controller to determine the line of the cache includes incoherent data.

The computer implemented method 300 may also include one or more other process blocks. In one or more embodiments, the method 300 can include detecting an error via the purge controller in data associated with the line of the cache corresponding with the first operation and using the physical address loaded to the controller to purge data from the line of the cache. The method 300 may also include detecting an error via the purge controller in a directory of the purge controller and loading the purge controller with a line in the directory and using a physical address loaded to the controller to purge data from the line of the directory. In one or more embodiments, the physical address of the line of the cache includes a row and a compartment of the cache. Also, in one or more embodiments, determining the physical address of the line in response to having performed the first operation includes performing an initial pass of instruction pipelining to lookup the virtual address, wherein the virtual address corresponds with a location in the cache, the physical address is then determined from that location in the cache, and the physical address is then used for subsequently performing other operations. In one or more embodiments, the location corresponds with a row and a compartment of the cache that determines the physical address.

Various technical benefits are achieved using the system and methods described herein, including the capability of providing enhanced performance for applications with exclusive access to the co-processors while also allowing applications that do not need performance access to accelerators when shared access is available. In this manner, the computer system can realize performance gains through the use of co-processors in the system, thereby improving overall processing speeds.

The present invention may be a system, a computer implemented method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for maintaining coherency utilizing physical address comparison within a computing system, comprising:
    performing operations on data in lines of a cache of the computing system;
    loading a controller of the cache with virtual addresses into an address bank of the controller of the cache, wherein the virtual addresses include a tag and a respective congruence class of the lines associated with performing the operations by utilizing the cache;
    determining a physical address of a line in response to having performed a first cache directory lookup of the line and loading a physical address into the controller;
    comparing the physical address loaded into the controller from the first operation with physical addresses associated with other operations and determining whether the other operations utilize the same physical address as the first operation;
    in response to two or more of the physical addresses matching, determining whether a conflict exists in the data at the physical addresses that match; and
    purging data located at the physical address loaded into the controller, wherein at least one operation of the other operations is operating on data located at a same memory row as the data located at the physical address loaded into the controller
    wherein determining the physical address of the line in response to having performed the first operation comprising performing an initial pipeline pass to determine a compartment associated with the respective congruence class.

2. The computer implemented method of claim 1 being otherwise free from looking up a virtual address in the address bank of the controller to determine the line of the cache includes incoherent data.

3. The computer implemented method of claim 1 wherein the controller is a purge controller.

4. The computer implemented method of claim 3 further comprising detecting an error via the purge controller in data associated with the line of the cache corresponding with the first operation and using the physical address loaded into the controller to purge data from the line of the cache.

5. The computer implemented method of claim 3 further comprising detecting an error via the purge controller in a directory of the purge controller and loading the purge controller with a line in the directory and using a physical address loaded into the controller to purge data from the line of the directory.

6. The computer implemented method of claim 1 wherein the physical address of the line of the cache comprises a row and a compartment of the cache.

7. The computer implemented method of claim 1 wherein the first operation is a non-purge operation.

8. The computer implemented method of claim 1 wherein determining the physical address of the line in response to having performed the first operation comprises performing an initial pass of instruction pipelining to look up the virtual address, wherein the virtual address corresponds with a location in the cache, the physical address is then determined from that location in the cache, and the physical address is then used for subsequently performing other operations.

9. The computer implemented method of claim 8 wherein the location corresponds with a row and a compartment of the cache that determines the physical address.

10. A cache of a computing system storing cache data and comprising one or more processing circuits and a purge controller, the one or more processing circuits performing operations on data in lines of the cache of the computing system and loading virtual addresses into an address bank of the purge controller, wherein the virtual addresses include a tag and a respective congruence class of the lines associated with performing the operations utilizing the cache, the one or more processing circuits determining a physical address of a line in response to having performed a first cache directory lookup of the line and loading a physical address into the controller, comparing the physical address loaded into the controller from the first operation with physical addresses associated with other operations, determining whether the other operations utilize the same physical address as the first operation, in response to two or more of the physical addresses matching, determining whether a conflict exists in the data at the physical addresses that match, and purging data located at the physical address loaded into the controller, wherein at least one operation of the other operations is operating on data located at a same memory row as the data located at the physical address loaded into the controller.

11. The cache of claim 10 wherein the one or more processing circuits are otherwise free from looking up a virtual address in the address bank of the controller to determine the line of the cache includes incoherent data.

12. The cache of claim 10 wherein the controller is a purge controller and the one or more processing circuits detect an error via the purge controller in data associated with the line of the cache corresponding with the first operation and use the physical address loaded into the controller to purge data from the line of the cache.

13. The cache of claim 10 wherein the first operation is a non-purge operation.

14. The cache of claim 10 wherein determining the physical address of the line in response to having performed the first operation comprises performing an initial pass of instruction pipelining to look up the virtual address, wherein the virtual address corresponds with a location in the cache, the physical address is then determined from that location in the cache, and the physical address is then used for subsequently performing other operations.

15. The cache of claim 14 wherein the location corresponds with a row and a compartment of the cache that determines the physical address.

16. A computer program product comprising a computer readable storage medium having program instructions embodied therewith, the program instructions executable by a computer processor to cause the computer processor to perform a method for maintaining coherency utilizing physical address comparison, the method comprising:
   performing operations on data in lines of a cache of the computing processor;
   loading a controller of the cache with virtual addresses into an address bank of the controller of the cache, wherein the virtual addresses include a tag and a respective congruence class of the lines associated with performing the operations by utilizing the cache;
   determining a physical address of a line in response to having performed a first cache directory lookup of the line and loading a physical address into the controller;
   comparing the physical address loaded into the controller from the first operation with physical addresses associated with other operations and determining whether the other operations utilize the same physical address as the first operation;
   in response to two or more of the physical addresses matching, determining whether a conflict exists in the data at the physical addresses that match; and
   purging data located at the physical address loaded into the controller, wherein at least one operation of the other operations is operating on data located at a same memory row as the data located at the physical address loaded into the controller.

17. The computer program product of claim 16 wherein the method is otherwise free from looking up a virtual address in the address bank of the controller to determine the line of the cache includes incoherent data.

18. The computer program product of claim 16 wherein the controller is a purge controller and the method further comprises detecting an error via the purge controller in data associated with the line of the cache corresponding with the first operation and using the physical address loaded into the controller to purge data from the line of the cache.

19. The computer program product of claim 16 wherein the first operation is a non-purge operation.

20. The computer program product of claim 16 wherein determining the physical address of the line in response to having performed the first operation comprises performing an initial pass of instruction pipelining to look up the virtual address, wherein the virtual address corresponds with a location in the cache, the physical address is then determined from that location in the cache, and the physical address is then used for subsequently performing other operations.

* * * * *